Patented Feb. 6, 1951

2,540,158

UNITED STATES PATENT OFFICE 2,540,158

PLANOGRAPHIC PRINTING AND ADHESIVE SHEETING FOR USE THEREIN

Charles H. Van Dusen, Jr., Willoughby, Ohio, assignor to Addressograph-Multigraph Corporation, Wilmington, Del., a corporation of Delaware No Drawing. Application January 29, 1947, Serial No. 725,151

1 Claim. (Cl. 101—149.2)

This invention relates to planographic printing and to an adhesive sheeting used as a masking out material on paper planographic plates.

More particularly, this invention relates to a normally tacky pressure sensitive adhesive sheeting which is particularly adapted for use in connection with paper planographic printing plates for masking or blocking out selected areas or portions of the written or printed matter inscribed thereon as well as for enabling other matter to be written or typed by lithographic image-forming materials upon a piece of the new sheeting adhesively attached to a paper planographic printing plate or the like.

Various attempts have been made heretofore to employ normally tacky pressure-sensitive adhesive sheeting for use as masking or blocking out material on paper planographic printing plates.

However, one of the difficulties heretofore experienced in attempts to use conventional normally tacky pressure-sensitive adhesive sheetings for masking out or blocking out materials on paper planographic printing plates is due to the fact that most of such normally tacky pressure-sensitive adhesive sheetings have exhibited a tendency for the normally tacky pressure-sensitive adhesive coating thereon to offset from the adhesively coated face onto the non-tacky or uncoated face of the sheeting. Inasmuch as such adhesives as are used on normally tacky pressure-sensitive adhesive sheetings of the character referred to above contain materials, such as natural wood rosin or gum rosin or various synthetic resins, or rubber, which are receptive to the fatty or greasy inks used in planographic printing, the non-tacky or uncoated face of the masking out or blocking out material is thereby rendered receptive to lithographic inks used during the operation of reproducing copies from such paper planographic printing plates by means of rotary offset planographic printing presses and the like. Hence such normally tacky pressure-sensitive adhesive sheets have not been satisfactory for use as blocking out or masking out materials upon paper planographic printing plates.

An object of the present invention is to provide a new and improved normally tacky pressure-sensitive adhesive sheeting which may be used as a masking out or blocking out material upon paper planographic printing plates and which is substantially free from any tendency of the adhesive coating to offset to the non-tacky face of the sheeting when the same is wound in coils or like forms for commercial use.

Another object of the present invention is to improve upon the known normally tacky pressure-sensitive adhesive sheetings such, for example, as that which is disclosed in United States Letters Patent No. 2,177,627, granted October 31, 1939, to Richard Gurley Drew, as patentee, on "Adhesive Sheeting," so that such prior normally tacky pressure-sensitive adhesive sheetings may be used as masking out or blocking out materials on paper planographic printing plates and without being receptive to the fatty or greasy inks used in planographic printing.

Other and further objects of the present invention will be apparent from the following description and claim which, by way of illustration, describe preferred embodiments of the invention and the principles thereof and what I now consider to be the best mode in which I have contemplated applying these principles.

Thus, in the practice of the present invention, I have found that if the non-tacky face of the backing sheet embodied in such normally tacky pressure-sensitive adhesive sheetings is coated with a water-soluble non-tacky coating which is allowed to dry thereon before the adhesive sheeting is wound into roll form or otherwise prepared for sale and use the tendency of the water-insoluble normally tacky pressure-sensitive adhesive coating on the normally tacky face of the adhesive sheeting to offset to the non-tacky face thereof is prevented and a new adhesive sheeting for attachment to paper planographic printing as a masking or blocking out material, or otherwise, is thus afforded.

More specifically, I have found that if a water-soluble non-tacky coating composed of one or more materials selected from the group consisting of gelatin, dextrin, starch, polyvinyl alcohol, and water-soluble gums such, for example, as gum arabic, is applied to the non-tacky face of the normally tacky pressure-sensitive adhesive sheeting and allowed to dry the resulting adhesive sheeting may be wound into roll form and withdrawn therefrom as used without offsetting of the normally tacky pressure-sensitive adhesive to the thus coated non-tacky face of the sheeting since such water-soluble materials have substantially no affinity for the normally tacky pressure-sensitive adhesive on the tacky face of the new adhesive sheeting.

One form of commercially used and available normally tacky pressure-sensitive adhesive sheeting in which the present invention may be embodied is disclosed in the aforesaid United States Letters Patent No. 2,177,627 and includes a non-fibrous backing or base sheet composed of a transparent, flexible non-fibrous film of gelatinized cellulosic material such, for example, as regenerated cellulose (as normal or unwaterproofed "cellophane"). Such non-fibrous transparent backing or base sheets may be coated with any selected one of various water-insoluble normally tacky pressure-sensitive coating material firmly united to the backing sheet. Among such water-insoluble normally tacky pressure-sensitive adhesive coatings which are employed on such backing or base sheets are those disclosed in United States Letters Patent No. 2,177,627. Thus among the transparent water-insoluble normally tacky pressure-sensitive adhesive coatings disclosed in said patent is a coating cement which may be prepared according to the following example:

Example

| | Parts by weight |
|---|---|
| Rosin | 160 to 200 |
| Thin latex crepe rubber | 250 |
| Beta naphthol (antioxidant) | 2.5 |
| Benzol (solvent) | 3248 |

The rubber specified in the foregoing example may be so-called double breakdown latex crepe or smoked sheet rubber, in whole or in part, and the rosin specified may be either wood rosin or gum rosin or any one of various synthetic resins such as cumarone resin or other synthetic resins may be employed.

The new adhesive sheeting may be used as a masking or blocking out material on paper planographic printing plates and when so used it is preferably, but not necessarily, transparent so that the typewritten or other matter written or inscribed on the underlying plate and masked out thereby may readily be seen through the thus used masking or blocking out material. However, the new adhesive sheeting need not necessarily embody a transparent base sheet since fibrous or non-fibrous opaque paper or like cellulose base sheets may be employed in making the new adhesive sheeting in place of transparent base sheet hereinbefore referred to.

The new adhesive sheeting may be used not only as a masking out material but it may also be employed for the purpose of enabling typewritten or other material to be inscribed thereon by means of a suitable typewriter ribbon image-forming material or by means of a suitable lithographic image-forming crayon or pencil or the like either in place of or independently of the material blocked or masked out from the underlying paper planographic printing plate. In this usage a second application of the aqueous planographic etching or repellent solution over the masking out material may be necessary in conditioning a paper planographic printing plate having the adhesive sheeting thereon for use in a planographic printing operation since the base sheet of the new adhesive sheeting is not as hydrophylic as the paper planographic printing plate to which it may be applied.

It is, therefore, unnecessary to remove the water-soluble coating from the non-tacky face of the new adhesive sheeting prior to attaching a section of the same to a paper planographic printing plate since the water-soluble non-tacky coating employed is preferably of a character which will not interfere with the application of conventional lithographic image-forming materials to the surface of the new adhesive sheeting. Moreover, even if some slight off-setting of the water-insoluble normally tacky pressure-sensitive adhesive coating to the non-tacky water-soluble coating should occur this will not cause difficulty in the use of the new adhesive sheeting as a masking out or blocking out material upon paper planographic printing plates because such water-insoluble tacky pressure-sensitive adhesive coating as may thus offset to the non-tacky water-soluble coating will be washed from the base sheet when the aqueous lithographic etching or repellent solution is applied thereto during the operation of conditioning a paper planographic printing plate, having the said masking out material thereon, for use in planographic printing.

It will thus be seen that the present invention provides a new and improved normally tacky pressure-sensitive adhesive sheeting having a water-soluble coating on its non-tacky face which prevents offsetting of the normally tacky pressure-sensitive adhesive to the non-tacky face of the new sheeting.

It will also be seen from the foregoing description that the new adhesive sheeting may be employed generally in any of the many uses to which such normally tacky pressure-sensitive adhesive sheetings are applied while, at the same time, being especially adapted for use as a masking or blocking out material for use upon paper planographic printing plates and that when so used it has the desirable advantages and characteristics, and accomplishes its intended objects, including those hereinbefore pointed out and others which are inherent in the invention.

I claim:

In the art of planographic printing from paper planographic printing plates, the improvement which resides in masking out a selected area of the printing surface of a paper planographic printing plate prior to conditioning the said paper planographic printing plate for use in a planographic printing operation by applying over the said selected area of the printing surface of the said paper planographic printing plate an adhesive sheeting consisting of a flexible transparent backing or base sheet having on one surface thereof a normally tacky and pressure-sensitive flexible adesive coating by means of which the said adhesive sheeting is adhesively secured in position of use over the said selected area of the printing surface of the said paper planographic printing plate and having on its opposite surface a water-soluble non-tacky coating composed of one or more materials which are substantially devoid of any affinity for the said pressure-sensitive flexible adhesive coating and which are selected from the group consisting of gelatin, dextrin, starch, polyvinyl-alcohol and gum-arabic, forming a planographic image on the printing surface of the said adhesive sheeting and over the said water-soluble non-tacky coating thereon by means of a planographic image-forming material, and washing the printing surface of the said planographic printing plate and the said water-soluble and non-tacky coating and the said planographic image on the said adhesive sheeting with an aqueous planographic etching solution as an incident to conditioning said paper planographic printing plate and the surface of the said adhesive sheeting having the said planographic image thereon for use in a planographic printing operation.

CHARLES H. VAN DUSEN, JR.

REFERENCES CITED

The following references are of record in the file of this patent:

UNITED STATES PATENTS

| Number | Name | Date |
|---|---|---|
| 1,651,011 | Adams | Nov. 29, 1927 |
| 2,205,998 | Wescott | June 25, 1940 |
| 2,215,995 | Bellack | Sept. 24, 1940 |
| 2,364,875 | Schieman | Dec. 12, 1944 |
| 2,423,553 | Cochran | July 8, 1947 |

FOREIGN PATENTS

| Number | Country | Date |
|---|---|---|
| 845 | Great Britain | Mar. 27, 1862 |